United States Patent
Baek et al.

(10) Patent No.: US 10,066,038 B2
(45) Date of Patent: Sep. 4, 2018

(54) POLYCARBONATE-BASED THERMOPLASTIC RESIN COMPOSITION AND PRODUCT USING SAME

(71) Applicant: LOTTE CHEMICAL CORPORATION, Seoul (KR)

(72) Inventors: Woonseon Baek, Daejeon (KR); Kyungtae Kim, Incheon (KR); Jaejoon Heo, Daejeon (KR); Myungwook Kim, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 15/526,795

(22) PCT Filed: Jun. 25, 2015

(86) PCT No.: PCT/KR2015/006493
§ 371 (c)(1),
(2) Date: May 15, 2017

(87) PCT Pub. No.: WO2016/076503
PCT Pub. Date: May 19, 2016

(65) Prior Publication Data
US 2017/0320982 A1      Nov. 9, 2017

(30) Foreign Application Priority Data

Nov. 14, 2014 (KR) .................. 10-2014-0158474

(51) Int. Cl.
| | | |
|---|---|---|
| *C08L 69/00* | (2006.01) | |
| *C08L 33/12* | (2006.01) | |
| *C08L 25/14* | (2006.01) | |
| *C08F 212/10* | (2006.01) | |
| *C08G 64/02* | (2006.01) | |
| *C08F 220/06* | (2006.01) | |

(52) U.S. Cl.
CPC .......... *C08F 212/10* (2013.01); *C08F 220/06* (2013.01); *C08G 64/02* (2013.01); *C08F 2500/04* (2013.01); *C08F 2500/12* (2013.01)

(58) Field of Classification Search
CPC .......... C08L 25/12; C08L 25/14; C08L 33/12; C08L 69/00
See application file for complete search history.

(56) References Cited

U.S. PATENT DOCUMENTS 5,910,538 A    6/1999 Padwa et al.

| | | |
|---|---|---|
| 2009/0214827 A1 | 8/2009 | Howie, Jr. |
| 2011/0021677 A1 | 1/2011 | Kwon et al. |
| 2014/0187719 A1 | 7/2014 | Kim et al. |

FOREIGN PATENT DOCUMENTS

| | | |
|---|---|---|
| EP | 0 247 257 B1 | 7/1993 |
| JP | S57-185340 A | 11/1982 |
| JP | H09-118804 A | 5/1997 |
| JP | H11-060930 A | 3/1999 |
| JP | 2000-264979 A | 9/2000 |
| JP | 2011-516682 A | 5/2011 |
| JP | 2014-533763 A | 12/2014 |
| KR | 10-0149247 B1 | 10/1998 |
| KR | 10-2001-0108464 A | 12/2001 |
| KR | 10-2006-0086194 A | 7/2006 |
| KR | 10-2009-0110129 A | 10/2009 |
| KR | 10-2012-0055277 A | 5/2012 |
| KR | 10-2013-0015282 A | 2/2013 |
| KR | 10-2013-0090362 A | 8/2013 |
| KR | 10-2013-0095189 A | 8/2013 |
| KR | 10-2014-0092735 A | 7/2014 |
| KR | 10-1440732 B1 | 9/2014 |
| RU | 2228343 C2 | 5/2004 |
| WO | WO 2014/104485 A | 7/2014 |

OTHER PUBLICATIONS

Machine-generated English-language translation of the description of KR 1140732 B1.*
International Search Report for PCT/KR2015/006493 dated Sep. 30, 2015 from Korean Intellectual Property Office.
Japanese Office Action for related JP Application No. 2017-525825 dated Mar. 20, 2018 from Japanese Patent Office.
Russian Office Action for related Russian Application No. 2017119033/05(032926) dated Apr. 11, 2018 from Russian Patent Office.
European Search Report for related EP Application No. 15 85 8260 dated Apr. 25, 2018 from European Patent Office.

* cited by examiner

*Primary Examiner* — Vu A Nguyen
(74) *Attorney, Agent, or Firm* — Paratus Law Group, PLLC

(57) ABSTRACT

Disclosed are a thermoplastic resin composition which, through combination of certain compatibilizers, satisfies high-gloss and high-impact properties, does not generate weld lines and flow marks, and furthermore, has appropriate impact strength and can sufficiently satisfy scratch resistance required for adoption in actual products, and a product using the same. The present invention provides a polycarbonate-based thermoplastic resin composition including 5-28 wt % of a polycarbonate thermoplastic resin; 55-80 wt % of a polymethylmethacrylate copolymer; 1-20 wt % of a styrene-acrylonitrile copolymer; and 1-20 wt % of a styrene-methylmethacrylate-butyl-acrylate copolymer, and a product using the same.

7 Claims, No Drawings

POLYCARBONATE-BASED THERMOPLASTIC RESIN COMPOSITION AND PRODUCT USING SAME

CROSS REFERENCE TO PRIOR APPLICATIONS

This application is a National Stage Patent Application of PCT International Patent Application No. PCT/KR2015/006493 (filed on Jun. 25, 2015) under 35 U.S.C. § 371, which claims priority to Korean Patent Application No. 10-2014-0158474 (filed on Nov. 14, 2014), which are all hereby incorporated by reference in their entirety.

TECHNICAL FIELD

The present invention relates to a polycarbonate-based thermoplastic resin composition and a product using the same, and more particularly, to a polycarbonate-based thermoplastic resin composition having excellent scratch resistance and a product using the same.

BACKGROUND ART

Polycarbonate resins have excellent impact resistance and mechanical properties and exhibit excellent dimensional stability and wide colorability, and thus are widely used as housings for electrical and electronic products or as automobile components and the like.

Recently, in order to develop products having high-gloss textures, polycarbonate resins used for automobile exteriors have usually been subjected to coating processes. However, since such processes involve large numbers of steps, and have limitations, such as high defect rates, high incidence rates of harmful volatile substances, and increased cost, non-coating materials are being developed.

However, there have not yet been any examples in which a non-coating high-impact thermoplastic resin has been applied to an automobile exterior material. Although some polymethylmethacrylate (hereinafter referred to as PMMA) or PMMA/IR (impact rubber) products are being utilized in exterior components, PMMA is characteristically low-impact, and thus automobile manufacturers have called for the development of weather resistant, high-gloss, high-impact thermoplastic resins.

A weather resistant resin (AES resin) prepared by graft copolymerization of an ethylene-propylene-based rubber polymer (EPR, EPDM) and a predetermined amount of a mixed solution having styrene-based and acrylonitrile-based monomers dissolved therein is disclosed in Korean Patent Application Laid-open Publication No. 2006-0086194, but has reduced rigidity and scratch resistance when applied to polycarbonate resins, and thus has the limitation of being unsuitable for adoption in non-coating.

Korean Patent Application Laid-open Publication No. 2009-0110129 discloses a feature in which a resin composition including an acrylate-styrene-acrylonitrile (ASA) resin and PMMA is applied to an automobile exterior material. However, the disclosed resin composition has low heat resistance and impact strength, and has the limitation of poor mechanical properties.

A polycarbonate and a polycarbonate resin composition in which polyalkylaryl siloxane is added to a polycarbonate-polysiloxane copolymer are disclosed in Korean Patent Application Laid-open Publication No. 2012-0055277, but are inadequate for passing an automobile exterior weather resistance test, and also have weak scratch resistance.

A thermoplastic molding composition which includes a blend of a grafted rubber including a crosslinked rubber substrate that includes a styrene core and an acrylate rubber shell; a grafted phase grafted thereon, and a copolymer matrix including a copolymer such as styrene/acrylonitrile; and an aromatic (co)polycarbonate resin is disclosed in Korean Patent Application Laid-open Publication No. 2001-0108464 discloses, but has the limitations of poor gloss and poor scratch resistance.

Meanwhile, in Korean Patent Application No. 10-2013-0095189, the present inventors disclosed a polycarbonate-based thermoplastic resin composition capable of overcoming the limitations described above, but said polycarbonate-based thermoplastic resin composition was noted as having excessive impact strength, and as having scratch resistance that does not sufficiently satisfy the scratch resistance required for adoption in actual products.

DISCLOSURE OF THE INVENTION

Technical Problem

Polycarbonate and polymethacrylate are transparent thermoplastic resins, but have different refractive indices and exhibit poor compatibility when mixed such that weld lines and flow marks occur extensively in a molding product. Therefore, acrylonitrile-butadiene-styrene (hereinafter referred to as 'ABS') has typically been utilized in order to increase compatibility and thereby mitigate defects caused by the weld lines and flow marks. However, since ABS is characterized by rapidly decreasing weather resistance, there was a limitation in that ABS could not be utilized in non-coating exterior materials.

Accordingly, it is an object of the present invention to provide, through combination of certain compatibilizers, a thermoplastic resin composition, which satisfies high-gloss and high-impact properties, does not generate weld lines and flow marks, and furthermore, has appropriate impact strength and can sufficiently satisfy the scratch resistance required for adoption in actual products, and to provide a product using the same.

Technical Solution

In order to achieve objectives above, the present invention provides a polycarbonate-based thermoplastic resin composition including 5-28 wt % of a polycarbonate thermoplastic resin; 55-80 wt % of a polymethylmethacrylate copolymer; 1-20 wt % of a styrene-acrylonitrile copolymer; and 1-20 wt % of a styrene-methylmethacrylate-butyl-acrylate copolymer.

A polycarbonate-based thermoplastic resin composition is also provided, wherein the mass-average molecular weight of the polycarbonate thermoplastic resin is 25,000-40,000.

A polycarbonate-based thermoplastic resin composition is also provided, wherein the resin melt flow rate (MFR, 230° C., 3.8 kgf) of the polymethylmethacrylate copolymer is 0.1-25 g/10 min.

A polycarbonate-based thermoplastic resin composition is also provided, wherein the acrylonitrile content of the styrene-acrylonitrile copolymer is 15-40 wt %.

A polycarbonate-based thermoplastic resin composition is also provided, wherein the butyl-acrylate content of the styrene-methylmethacrylate-butyl-acrylate copolymer is 10-60 wt %.

In order to achieve other objectives above, the present invention provides a product including the polycarbonate-based thermoplastic resin composition.

Advantageous Effects

A polycarbonate-based thermoplastic resin composition and a product using the same according to the present invention replaces ABS, which was typically used as a compatibilizer, with a styrene-acrylonitrile copolymer having high weather resistance, and thereby provides a polycarbonate-based thermoplastic resin composition, which satisfies weather resistance, high-gloss, and high-impact, and does not generate weld lines and flow marks. The polycarbonate-based thermoplastic resin composition may be usefully used in automobile exterior materials, in particular, non-coating exterior materials.

In addition, the present applicants were able to achieve the objectives mentioned above by adopting a completely different polymethylmethacrylate copolymer content from the polycarbonate thermoplastic resin disclosed in Korean Patent Application No. 10-2013-0095189. Specifically, a polycarbonate-based thermoplastic resin composition with further enhanced scratch resistance having appropriate impact strength and also having a scratch resistance of at least pencil hardness 2H required for adoption in actual products, and a product using the same may be provided.

MODE FOR CARRYING OUT THE INVENTION

Hereinafter, exemplary embodiments of the present invention are described in detail. When it is determined that describing relevant well-known techniques in detail during the course of describing the present invention can obscure the essence of the present invention, such detailed description will be excluded. Throughout the specification, when a particular part is said to "include" an element, the presence of other elements is not precluded and other elements may be further included, unless explicitly indicated otherwise.

The present inventors recognized the limitation in which a typical ABS resin utilized to enhance compatibility significantly reduces weather resistance in a thermoplastic resin composition including a polycarbonate thermoplastic resin and a polymethylmethacrylate copolymer, and thus cannot be utilized in non-coating exterior materials. After persistent research, the present inventors discovered that a polycarbonate-based thermoplastic resin composition may be prepared, in which weld lines and flow marks are not generated, and at the same time, weather resistance, high-gloss, and high-impact are satisfied when a styrene-acrylonitrile copolymer and a styrene-methylmethacrylate-butyl-acrylate copolymer are utilized as compatibilizers. Meanwhile, the present inventors achieved the present invention after discovering that a polycarbonate-based thermoplastic resin composition, having appropriate impact strength and satisfying a pencil hardness of at least 2H required for adoption in an actual product, may be prepared by utilizing the polycarbonate thermoplastic resin and the polymethylmethacrylate copolymer in a specific content range.

Therefore, the present invention discloses a polycarbonate-based thermoplastic resin composition including 5-28 wt % of a polycarbonate thermoplastic resin; 55-80 wt % of a polymethylmethacrylate copolymer; 1-20 wt % of a styrene-acrylonitrile copolymer; and 1-20 wt % of a styrene-methylmethacrylate-butyl-acrylate copolymer. Hereinafter, each component of the polycarbonate-based thermoplastic resin composition according to the present invention is described in greater detail.

(A) Polycarbonate Thermoplastic Resin

A polycarbonate thermoplastic resin used in the present invention has excellent impact resistance, heat resistance, weather resistance, self-fire extinguishing properties, flexibility, processability, and transparency. Excellent weather resistance ensures that outstanding physical properties are maintained for a long period of time, and resistance to heat and cold ensure that performance is maintained even under severe temperatures changes. In the present invention, the polycarbonate thermoplastic resin content is 5-28 wt %, desirably 10-20 wt %, and more desirably 12-18%, such that in a final thermoplastic resin composition, balance is maintained in the physical properties of impact resistance, heat resistance, weather resistance, and processability, and in particular, appropriate impact strength is maintained while scratch resistance is further enhanced by maintaining a pencil hardness of at least 2H, which is required for adoption in actual products. That is, a resin composition including an excessive amount of polycarbonate tends to exhibit excessively high impact strength with decreased thickness such that, while requiring a surface hardness of at least a pencil hardness of 2H in order to be adopted in actual products, is unable to satisfy said requirement.

Moreover, the polycarbonate thermoplastic resin according to an embodiment of the present invention may have a mass-average molecular weight (Mw) of 25,000-40,000, desirably 30,000-35,000. Furthermore, a branched-chain form may be used, and desirably, the polycarbonate thermoplastic resin may be used, which is prepared by adding, with respect to the total amount of diphenols used in polymerization, 0.05-2 mol % of a trifunctional or higher multifunctional compound, for example, a compound having a trihydric or higher phenol.

Meanwhile, the polycarbonate thermoplastic resin used in the present invention may be prepared according to a typical preparation method. For example, the polycarbonate thermoplastic resin may be prepared by reacting dihydroxy phenol and phosgene in the presence of a molecular weight regulator and a catalyst, or by using an ester interchange reaction of a precursor obtained from dihydroxy phenol and diphenyl carbonate.

(B) Polymethylmethacrylate Copolymer

In the present invention, a polymethylmethacrylate copolymer prepared by typical bulk, emulsion, and suspension polymerization methods may be used. For example, a high-molecular weight polymethylmethacrylate obtained through addition reaction of a methylmethacrylate monomer by a polymerization initiator may be used.

The polymethylmethacrylate copolymer may be used, in which the resin melt flow rate (MFR, 230° C., 3.8 kgf) is 0.1-25 g/10 min, desirably 0.5-10 g/10 min, more desirably 1-5 g/10 min. When the resin melt flow rate is low, it may be difficult due to the reduced melt flow rate to obtain a satisfactory product, depending on the surface and size of the product. When the resin melt flow rate is excessively high, the melt flow rate improves but impact properties may be degraded.

Moreover, a high-fluidity polymethylmethacrylate copolymer may be used as the polymethylmethacrylate copolymer by further considering processability and impact strength. The polymethylmethacrylate copolymer used may desirably have a mass-average molecular weight of 50,000-150,000, more desirably 80,000-120,000.

In the present invention, the polymethylmethacrylate copolymer content may, in correspondence to the polycarbonate thermoplastic resin content, be relatively high at 55-80 wt %, desirably 61-70 wt %, and more desirably 62-68 wt %. When the polymethylmethacrylate copolymer content is outside the above range, it is difficult to satisfy an appropriate impact strength and the required pencil hardness of 2H or higher. When the content exceeds 80 wt %, impact resistance is poor, and thus defects may occur.

(C) Styrene-Acrylonitrile Copolymer

In a styrene-acrylonitrile copolymer used as one of the compatibilizers in the present invention, rigidity, weather resistance and the like may be adjusted by using bulk polymerization to adjust the contents of components. In order to enable the styrene-acrylonitrile copolymer to be used for improving the poor processability and the chemical resistance of polycarbonate, the use of a high-molecular weight copolymer having an acrylonitrile content of 15-40 wt % and a mass-average molecular weight of 100,000-200,000 may be desirable. More desirably, a copolymer having an acrylonitrile content of 20-30 wt % and a mass-average molecular weight of 120,000-150,000 may be used in order to maintain mechanical strength and optimal physical properties.

The styrene-acrylonitrile copolymer content is 1-20 wt %, desirably 5-15 wt %, and more desirably 7-13 wt %. When the content is below 1 wt %, rigidity may be degraded, and when the content exceeds 20 wt %, impact strength may be degraded.

(D) Styrene-Methylmethacrylate-Butyl-Acrylate Copolymer

In the final resin composition, the content of a styrene-methylmethacrylate-butyl-acrylate copolymer used as a compatibilizer in combination with the styrene-acrylonitrile copolymer is 1-20 wt %, desirably 5-15 wt %, and more desirably 7-13 wt %. The styrene-methylmethacrylate-butyl-acrylate copolymer prevents the occurrence of weld line and flow marks, and fundamentally prevents the reduction in weather resistance that typically results from using ABS.

The styrene-methylmethacrylate-butyl-acrylate copolymer may be used in the form of a multilayered powder having butyl-acrylate as a main raw material, and the butyl-acrylate content in the styrene-methylmethacrylate-butyl-acrylate copolymer may be 10-60 wt %, desirably 20-50 wt %.

A polycarbonate-based thermoplastic resin composition according to the present invention may further include additives according to respective uses thereof without departing from the objectives of the present invention. Antioxidants, impact-reinforcing agents, thermal stabilizers, release agents, nucleating agents, antistatic agents, inorganic agents, UV stabilizers, dyes, or pigments and the like may be used, alone or in mixtures of two or more kinds thereof, as additives in the typical manner. 0.1-10 parts by weight of the additives may be added with respect to 100 parts by weight of the polycarbonate-based thermoplastic resin.

Hereinafter, description is given with reference to specific examples according to the present invention.

First, specifications for components, such as polycarbonate resin, used in examples and comparative examples of the present invention are as follows.

1) Polycarbonate (PC) Thermoplastic Resin

A polycarbonate thermoplastic resin (3030PJ, Samyang Hwasung) having a mass-average molecular weight of 33,000 was used.

2) Polymethylmethacrylate (PMMA) Copolymer

A polymethylmethacrylate copolymer (VH, Daesan MMA) having a resin melt flow rate (MFR, 230° C., 3.8 kgf) of 2 g/10 min was used.

3) Styrene-Acrylonitrile (SAN) Copolymer

A styrene-acrylonitrile copolymer (SAN 326, Kumho Petrochemical) having an acrylonitrile content of 26 wt % was used.

4) Styrene-Methylmethacrylate-Butyl-Acrylate Copolymer

IR-441, a commercial product from MRC, was used.

Example 1

15 wt % of a polycarbonate thermoplastic resin, 65 wt % of a polymethylmethacrylate resin, 10 wt % of a styrene-acrylonitrile copolymer, and 10 wt % of a styrene-methylmethacrylate-butyl-acrylate copolymer were quantified and mixed in the given ratio, a twin-screw extruder (TEM-26SS, Toshiba) heated to 280° C. was used to prepare a mixture in chip form under conditions of a melting temperature of 300° C., an injection rate of 12 kg/hr, and a screw rotation speed of 200 rpm, and an injection molding machine (170MT, Woojin Selex) and a mold in the shape of an ASTM specimen were used to prepare a specimen.

Comparative Example 1

Other than excluding the polymethylmethacrylate resin from Example 1 and quantifying 80 wt % of the polycarbonate resin, a specimen was prepared in the same way as in Example 1.

Comparative Example 2

Other than excluding the styrene-methylmethacrylate-butyl-acrylate copolymer from Example 1 and quantifying 60 wt % of the polycarbonate thermoplastic resin and 30 wt % of the styrene-acrylonitrile copolymer, a specimen was prepared in the same way as in Example 1.

Comparative Example 3

Other than excluding the styrene-acrylonitrile copolymer from Example 1 and quantifying 60 wt % of the polycarbonate thermoplastic resin and 30 wt % of the polymethylmethacrylate copolymer, a specimen was prepared in the same way as in Example 1.

Comparative Example 4

Other than excluding the styrene-methylmethacrylate-butyl-acrylate copolymer and the polymethylmethacrylate copolymer from Example 1 and quantifying 90 wt % of the polycarbonate thermoplastic resin, a specimen was prepared in the same way as in Example 1.

Comparative Example 5

Other than excluding the styrene-acrylonitrile copolymer and the polymethylmethacrylate copolymer from Example 1 and quantifying 90 wt % of the polycarbonate thermoplastic resin, a specimen was prepared in the same way as in Example 1.

Comparative Example 6

Other than excluding the styrene-acrylonitrile copolymer and the styrene-methylmethacrylate-butyl-acrylate copolymer from Example 1 and quantifying 70 wt % of the polycarbonate thermoplastic resin and 30 wt % of the polymethylmethacrylate copolymer, a specimen was prepared in the same way as in Example 1.

Comparative Example 7

Other than quantifying 50 wt % of the polycarbonate thermoplastic resin and 30 wt % of the polymethylmethacrylate copolymer, a specimen was prepared in the same way as in Example 1.

Components and contents (unit: wt %) according to the examples and comparative examples above are displayed in Table 1.

TABLE 1

| Item | Example 1 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| PC | 15 | 80 | 60 | 60 | 90 | 90 | 70 | 50 |
| PMMA | 65 | — | 30 | 30 | — | — | 30 | 30 |
| SAN | 10 | 10 | 10 | — | 10 | — | — | 10 |
| IR-441 | 10 | 10 | — | 10 | — | 10 | — | 10 |

Experimental Example

In order to evaluate the physical properties of a polycarbonate-based thermoplastic resin composition prepared according to the present invention, the mechanical properties, impact strength, gloss, and the like of specimens according to the above examples and comparative examples were measured, and the results thereof are displayed in Table 2 below.

[Measurement Methods]

(1) Resin melt flow rate (MFR): measured according to ASTM D1238 at 230° C. under a load condition of 3.8 kg.

(2) Density: measured according to ASTM D792

(3) IZOD impact strength: measured according to ASTM D256

(4) Heat deflection temperature (HDT): measured according to ASTM D648 under conditions of 1.82 MPa and 120° C./hr (5) Shrinkage (MD): measured in accordance with the test specifications of ISO-294-4

(6) Tensile strength, rupture stress, and elongation at rupture: measured according to ASTM D638 under condition of 50 mm/min (7) Flexural modulus and flexural strength: measured according to ASTM D790 under condition of 10 mm/min (8) Pencil hardness: measured according to JIS K-6301 under condition of 10 mm/20 sec

(12) Rockwell hardness: measured according to ASTM D785

(13) Gloss: measured by using REFO 60 glossmeter (DRLANGE) on specimen

(14) Surface of injection molded specimen: molding product examined for flow marks and weld lines

(15) Light resistance: specimen exposed to UV light using ATLAS UV cone equipment, and color b of exposed specimen with respect to standard specimen measured according to time.

TABLE 2

| Item | Unit | Example 1 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| MFR | (g/10 min) | 7.0 | 2.5 | 4.8 | 5.2 | 3.5 | 2.3 | 5.4 | 2.95 |
| Density | g/cm$^3$ | 1.19 | 1.19 | 1.18 | 1.19 | 1.19 | 1.19 | 1.19 | 1.187 |
| IZOD impact strength | kg·cm/cm | 6.4 | 70.5 | 8.2 | 35.4 | 22.5 | 80.5 | 9.5 | 21.6 |
| HDT | °C. | 105 | 115 | 100 | 99 | 100 | 95 | 115 | 100.6 |
| Shrinkage (MD) | % | 0.75 | 0.93 | 0.79 | 0.87 | 1 | 0.99 | 0.86 | 0.82 |
| Tensile strength | kgf/cm$^2$ | 680 | 600 | 720 | 660 | 660 | 580 | 720 | 670 |
| Rupture stress | kgf/cm$^2$ | 570 | 640 | 570 | 600 | 670 | 580 | 620 | 565 |
| Elongation at rupture | % | 50 | 120 | 60 | 70 | 113 | 100 | 80 | 109 |
| Flexural modulus | kgf/cm$^2$ | 25,000 | 23,000 | 28,000 | 25,000 | 26,000 | 20,000 | 27,000 | 25,900 |
| Flexural strength | kgf/cm$^2$ | 900 | 900 | 1,100 | 1,000 | 1,000 | 840 | 1,100 | 1,041 |
| Pencil hardness | — | 2H | F | H | H | HB | HB | H | H |
| Rockwell hardness | — | 122 | 120 | 123 | 122 | 122 | 121 | 122 | 121 |
| Gloss (60 degrees) | — | 115 | 102 | 110 | 121 | 102 | 97.6 | 114 | 114 |
| External appearance-Flow mark | — | excellent | satisfactory | deficient | deficient | satisfactory | satisfactory | poor | excellent |
| External appearance-Weld line | — | excellent | satisfactory | deficient | deficient | satisfactory | satisfactory | poor | excellent |
| 0 hr Color B | — | 0.5 | 3.02 | 0.68 | −0.97 | −2.08 | −0.37 | −1.46 | 1.13 |
| 8 hr Color B | — | 1.11 | 11.58 | 6.91 | 6.86 | 5.79 | 10.36 | 3.68 | 8.95 |
| 16 hr Color B | — | 5.57 | 17.34 | 10.73 | 10.72 | 16.77 | 16.02 | 7.48 | 12.85 |
| Delta b (8 hr) | — | 3.21 | 8.56 | 6.23 | 7.83 | 7.87 | 10.73 | 5.14 | 7.82 |
| Delta b (16 hr) | — | 4.51 | 14.32 | 10.05 | 11.69 | 18.85 | 16.39 | 8.94 | 11.72 |

Referring to Table 2, when prepared using a thermoplastic resin composition including optimal amounts of the polycarbonate thermoplastic resin, the polymethylmethacrylate copolymer, the styrene-acrylonitrile copolymer, and the styrene-methylmethacrylate-butyl-acrylate copolymer according to the present invention, a specimen exhibited high gloss and excellent light resistance, and had an excellent molded specimen surface. In particular, it was observed that the IZOD impact strength was at the level of 6.4 kg-cm/cm, which is sufficient for adoption in automobile exterior materials, and the pencil hardness was at least 2H, indicating excellent scratch resistance.

Conversely, it is observed that when the polymethylmethacrylate resin is excluded (Comparative Example 1), there is significant degradation of flexural modulus, hardness, and gloss, and when the styrene-methylmethacrylate-butyl-acrylate copolymer or the styrene-acrylonitrile copolymer is excluded (Comparative Examples 2 and 3), flow marks and weld lines are generated on the exterior. Moreover, it is observed that degradation of gloss and hardness occur when the styrene-methylmethacrylate-butyl-acrylate copolymer and the polymethylmethacrylate copolymer are excluded (Comparative Example 4), thermal properties, mechanical strength, and gloss are degraded when the styrene-acrylonitrile copolymer and the polymethylmethacrylate copolymer are excluded (Comparative Example 5), and external defects are generated when the styrene-acrylonitrile copolymer and the styrene-methylmethacrylate-butyl-acrylate copolymer are excluded (Comparative Example 6).

Meanwhile, it is observed that when the polycarbonate thermoplastic resin content exceeds a specified range and the polymethylmethacrylate copolymer content is blow a specified range (Comparative Example 7), impact strength is excessively high while pencil hardness does not exceed H.

Above, exemplary embodiments of the present invention have been described in detail. Description of the present invention is intended to be merely exemplary, and it will be understood by a person with ordinary skill in the technical field to which the present invention belongs that the present invention can be easily modified into other specific forms without changing the technical concepts or essential features thereof.

Thus, the scope of the present invention is defined by the scope of the claims below, rather than by the detailed description given above. All modifications or modified forms derived from the meaning, scope, and equivalent concepts of the claims are to be construed as being within the scope of the present invention.

The invention claimed is:

1. A polycarbonate-based thermoplastic resin composition comprising:
    12-18 wt % of a polycarbonate thermoplastic resin;
    62-68 wt % of a polymethylmethacrylate;
    7-13 wt % of a styrene-acrylonitrile copolymer; and
    7-13 wt % of a styrene-methylmethacrylate-butyl-acrylate copolymer,
    wherein a mass-average molecular weight of the polycarbonate thermoplastic resin is 33,000-40,000, and
    wherein the polycarbonate-based thermoplastic resin composition is configured for automobile non-coating exterior materials, and has an IZOD impact strength of at least 6.4 kg·cm/cm and a pencil hardness of at least 2H.

2. The polycarbonate-based thermoplastic resin composition of claim 1, wherein the resin melt flow rate (MFR, 230° C., 3.8 kgf) of the polymethylmethacrylate is 0.1-25 g/10 min.

3. The polycarbonate-based thermoplastic resin composition of claim 1, wherein the acrylonitrile content of the styrene-acrylonitrile copolymer is 15-40 wt %.

4. The polycarbonate-based thermoplastic resin composition of claim 1, wherein the butyl-acrylate content of the styrene-methylmethacrylate-butyl-acrylate copolymer is 10-60 wt %.

5. A product comprising the polycarbonate-based thermoplastic resin composition according to claim 1.

6. A product comprising the polycarbonate-based thermoplastic resin composition according to claim 2.

7. A product comprising the polycarbonate-based thermoplastic resin composition according to claim 4.

* * * * *